United States Patent
Satou

(10) Patent No.: US 6,396,656 B1
(45) Date of Patent: May 28, 2002

(54) WRONG INSERTION PREVENTION DEVICE FOR CARTRIDGE TYPE RECORDING MEDIUM

(75) Inventor: Tsutomu Satou, Yamagata (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/458,995

(22) Filed: Dec. 10, 1999

(30) Foreign Application Priority Data

Dec. 17, 1998 (JP) ............................................. 10-359660

(51) Int. Cl.⁷ .............................................. G11B 15/68
(52) U.S. Cl. ...................................... 360/92; 369/30.41
(58) Field of Search ............................. 312/223.2, 406; 360/92; 369/36, 77.2, 30.21, 30.36, 30.4, 30.41, 30.66

(56) References Cited

U.S. PATENT DOCUMENTS

| | | | | |
|---|---|---|---|---|
| 4,675,856 A | * | 6/1987 | Rudy et al. | 360/98.06 |
| 4,817,070 A | * | 3/1989 | Hug et al. | 369/36 |
| 4,959,582 A | * | 9/1990 | Meyer et al. | 312/307 |
| 5,068,758 A | * | 11/1991 | Choi | 360/96.6 |
| 5,223,670 A | * | 6/1993 | Hogan et al. | 174/35 MS |
| 5,450,254 A | * | 9/1995 | Sato et al. | 360/71 |
| 5,517,478 A | * | 5/1996 | Park | 369/77.2 |
| 5,692,623 A | * | 12/1997 | Todor et al. | 206/307.1 |
| 5,703,843 A | * | 12/1997 | Katsuyama et al. | 369/34 |
| 5,781,367 A | * | 7/1998 | Searle et al. | 360/92 |
| 5,820,055 A | * | 10/1998 | Leger et al. | 242/337 |
| 5,828,646 A | * | 10/1998 | Jones | 360/92 |
| 5,859,829 A | * | 1/1999 | Otsuka et al. | 369/77.2 |
| 5,877,938 A | * | 3/1999 | Hobbs et al. | 361/724 |
| 5,926,341 A | * | 7/1999 | Mueller et al. | 360/92 |
| 5,926,916 A | * | 7/1999 | Lee et al. | 16/230 |
| 5,936,795 A | * | 8/1999 | Theobald et al. | 360/92 |
| 6,144,520 A | * | 11/2000 | Yamakawa et al. | 360/92 |
| 6,163,431 A | * | 12/2000 | Fleckenstein et al. | 360/92 |
| 6,205,001 B1 | * | 3/2001 | Vanderheyden et al. | 242/338.4 |
| 6,216,057 B1 | * | 4/2001 | Jesionowski | 700/214 |

FOREIGN PATENT DOCUMENTS

| | | | |
|---|---|---|---|
| JP | 2-261736 | * | 10/1990 |
| JP | 8-180549 | | 7/1996 |
| JP | 9-212977 | | 8/1997 |
| JP | 10-269425 | * | 10/1998 |

* cited by examiner

Primary Examiner—Brian E. Miller
(74) Attorney, Agent, or Firm—Young & Thompson

(57) ABSTRACT

There will be provided a wrong insertion prevention device for a cartridge type recording medium capable of reliably preventing a cartridge type recording medium from being inserted into each unit cell in the reverse direction. The invention includes a wrong insertion detector 12 placed side by side with the cell main body 5 for housing a plurality of cartridge type recording media, for detecting wrong insertion of any of the cartridge type recording media 70; and door locking element 13 for operating on the basis of output information from this wrong insertion detector 12 to regulate a closing operation of the door for a housing which has been opened during an insertion operation of the recording medium 70, and the aforesaid wrong insertion detector 12 is configured by: a reverse direction insertion regulating member 5a installed within each cell 5A in the cell main body 5; and an optical sensor mechanism 6 for detecting a portion of the cartridge type recording medium, the insertion operation of which has been inhibited by the regulation of this reverse direction insertion regulating member 5a, and, which, as a result, has protruded outwardly.

20 Claims, 11 Drawing Sheets

PRIOR ART

WRONG INSERTION PREVENTION DEVICE FOR CARTRIDGE TYPE RECORDING MEDIUM

BACKGROUND OF THE INVENTION

1. Field of the Invention

The present invention relates to a wrong insertion prevention device for a cartridge type recording medium in a housing storage having a plurality of cells for housing a plurality of cartridge type recording media to be able to individually fetch them, and more particularly to a wrong insertion prevention device for a cartridge type recording medium suitable for a housing storage to be incorporated in a library device or the like for recording in and reproducing, an arbitrary cartridge type recording medium from among a plurality of cartridge type recording media.

2. Description of the Prior Art

Conventionally, in a library device for recording in and reproducing, among others, an arbitrary cartridge type recording medium from among a plurality of cartridge type recording media, there is incorporated a housing storage for housing a plurality of cartridge type recording media to be able to fetch them. This housing storage has a cell main body comprising a plurality of cells for housing cartridge type recording media respectively, and each unit cell is provided with a wrong insertion prevention device for a cartridge type recording medium for preventing wrong insertion of the cartridge type recording medium into the cell.

As a wrong insertion prevention mechanism for a cartridge type recording medium of this type, there is one specified in, for example, Japanese Patent Laid-Open No. 8-180549.

The aforesaid wrong insertion prevention mechanism for a cartridge type recording medium is, as shown in, for example, FIGS. 9(A) and (B), installed for each of a plurality of cells 52 provided within a cell main body 50.

This mechanism will be further described in detail. In FIG. 9(A), the cell main body 50 is formed like a ⊐-character in cross section, the lower part of which is opened, and is sequentially provided with a plurality of cell 52 areas in a direction perpendicular to the FIG. 9(A) within. Each of these cells 52 is partitioned by partitioning shelves 53 provided on both side walls at positions close to an opening 52a formed on the lower side in FIG. 9(A).

The wrong insertion prevention mechanism for a cartridge type recording medium installed within each cell 52 is configured by a pair of blade springs 51A and 51B installed on the both side wall portions of each cell 52 to oppose each other, and a deep partitioning member 54 provided on a deep inner surface (bottom surface) between each cell 52. The aforesaid blade springs 51A and 51B are arranged within the cell 52 in a mutually opposed state, and an engaging projection 51Aa or 51Ba is provided at the tip end of the blade spring 51A or 51B respectively.

Thus, when a cartridge type recording medium 60 is inserted into the cell 52 from the opening 52a in an ordinary state (normal state), medium-side inclined portions 60a formed at the tip end portion of this cartridge type recording medium 60 on both sides are to be inserted not to abut against the engaging projections 51Aa and 51Ba of the blade springs 51A and 51B as shown in FIG. 9(B), whereby the cartridge type recording medium 60 can be inserted to an appropriate housing position.

In contrast, when the cartridge type recording medium 60 is erroneously inserted with the front end thereof and the rear end reversed (that is, when the cartridge type recording medium 60 is inserted with its rear end turned toward the cell 52 side), its rear end bumps against the engaging projections 51Aa and 51Ba of the blade springs 51A and 51B halfway through the insertion of the cartridge type recording medium 60 as shown in FIG. 10 to thereby inhibit it from being inserted to the appropriate position.

Also, when the cartridge type recording medium 60 is obliquely inserted into the cell 52, the tip end thereof bumps against the deep partitioning member 54 halfway through the insertion as shown in FIG. 10(B). This inhibits the cartridge type recording medium 60 from being inserted into the cell 52. That is, when the cartridge type recording medium 60 is obliquely inserted with a difference in level, the insertion to the appropriate housing position within the cell 52 is inhibited.

Further, the conventional example shown in FIG. 11 shows that there is provided, on the side of the opening of the aforesaid cell 52, a door 55, on the inside of the tip end portion of which there is provided a contacting member 55a. In this case, in a state in which the cartridge type recording medium 60 has normally been inserted into the unit cell 52, the contacting member 55a of the door 55 is only brought into point-contact with the rear end portion of the cartridge type recording medium 60 as shown in FIG. 11, and the door 55 is completely closed.

In contrast, in the state in which the cartridge type recording medium 60 has been inserted into the cell 52 in the opposite direction, the contacting member 55a of the door 55 is brought into surface-contact with the tip end portion of the cartridge type recording medium 60 for abutting, and the door 55 is not completely closed. In this manner, the user can recognize the state in which the cartridge type recording medium 60 has been inserted into the cell 52 in the opposite direction.

However, in the aforesaid wrong insertion prevention mechanism for a cartridge type recording medium according to the conventional example, the cartridge type recording medium 60 is inhibited from being inserted into the cell 52 in the reverse direction with the provision of the engaging projections 51Aa and 51Ba on the blade springs 51A and 51B. Therefore, when the cartridge type recording medium 60 is further forcibly pushed in a state in which the rear end of the cartridge type recording medium 60 has been bumped against the engaging projections 51Aa and 51Ba, the blade springs 51A and 51B may possibly become deformed to widen the interval between projection portions 51Aa and 51Ba of the blade springs 51A and 51B, thus possibly allowing the cartridge type recording medium 60 to be inserted to the appropriate housing position. As a result, there have arisen inconvenience that it cannot be completely prevented to insert the cartridge type recording medium 60 into each unit cell 52 to the appropriate housing position in the reverse direction.

Also, in case of the cell 52 having the door 55, when the cartridge type recording medium 60 is further forcibly pushed in a state in which the rear end of the cartridge type recording medium 60 has been bumped against the engaging projections 51Aa and 51Ba, the contacting member 55a of the door 55 does not abut upon the tip end portion of the cartridge type recording medium 60, but the door 55 will be completely closed, and there arises a case where the operator cannot recognize that the cartridge type recording medium 60 has been inserted in the reverse direction.

BRIEF SUMMARY OF THE INVENTION

Object of the Invention

By improving such inconveniences of the conventional example, it is an object of the present invention to provide a wrong insertion prevention device for a cartridge type recording medium particularly capable of reliably preventing a cartridge type recording medium from being inserted into each unit cell in the reverse direction.

SUMMARY OF THE INVENTION

In order to attain the above-described objects, there are provided: a wrong insertion detection means placed side by side with the cell main body for housing a plurality of cartridge type recording media, for detecting wrong insertion of any of the cartridge type recording media; and a door locking mechanism for operating on the basis of output information from this wrong insertion detection means to regulate a closing operation of the door for the housing case main body which has been opened during an insertion operation of the aforesaid recording medium.

Thus, there has been adopted a technique in which the aforesaid wrong insertion detection means is configured by: a reverse direction insertion regulating member installed within each unit cell of the cell main body; and an optical sensor mechanism for detecting a portion of the cartridge type recording medium, the insertion operation of which has been inhibited by the regulation of this reverse direction insertion regulating member, and, which, as a result, has protruded outwardly.

For this reason, when the cartridge type recording medium is erroneously inserted into the unit cell after the door is opened on inserting the cartridge type recording medium, the tip end portion abuts upon the reverse direction insertion regulating member of the wrong insertion detection means and the inserting operation is inhibited. At the same time, the portion of the cartridge type recording medium, which has projected outwardly, is detected by an optical sensor mechanism, and is outputted as wrong insertion information. When the wrong insertion information is outputted from this optical sensor mechanism, the aforesaid door locking mechanism operates on the basis of this information to regulate the closing operation of the door.

Therefore, the operator can immediately learn that the cartridge type recording medium has been inserted in the reverse direction without seeing the cartridge type recording medium, and it is possible to reliably and immediately prevent the cartridge type recording medium from being inserted in the reverse direction.

In this case, when the aforesaid wrong insertion detection means detects wrong insertion of the cartridge type recording medium, the aforesaid door locking means can be configured so as to have a closing operation inhibiting function for immediately operating on receipt of the information to inhibit the door for the housing case main body, which has been opened, from being closed.

When performed as described above, there arises such a clear state that the door cannot be closed although the cartridge type recording medium has been inserted into the cell main body, and for this reason, it is possible to reliably learn that the cartridge type recording medium has been inserted in the reverse direction.

According to the invention there has been adopted a technique in which the door locking means is configured by: a door open/close guiding mechanism for guiding the door on opening or closing by reciprocally pivoting it within a range of a predetermined opening with one end thereof as a fulcrum of rotation; a door guide locking mechanism placed side by side with this door open/close guiding mechanism, for locking the door guiding operation by the aforesaid door open/close guiding mechanism on the basis of wrong insertion information from the aforesaid wrong insertion detection means; and a lock mechanism driving unit for urging the operation of the door guide locking mechanism at predetermined timing.

For this reason, in addition to the same functions as specified, above further the door locking means is configured so as to be divided into the door open/close guiding mechanism; a door guide locking mechanism for locking the operation of this door open/close guiding mechanism; and a locking mechanism driving unit, and therefore, there is the advantage that the locking operation can be executed reliably and quickly.

The aforesaid door open/close guiding mechanism may be configured by: a supporting arm, one end portion of which is rotatively supported on the housing case main body, and the other end of which engages with the aforesaid door and rotates following the open/close operation of the door; and a guide rail for guiding the tip end portion of this supporting arm on moving along the door. When performed as described above, there is the advantage that the guide rail effectively functions to make the open/close operation of the door smooth.

The aforesaid door guide locking mechanism may be configured such that when the aforesaid door open/close guiding mechanism is at the maximum opening or in a state close thereto, there is provided a first locking function for locking the open/close operation of the door open/close guiding mechanism.

Further, the aforesaid door guide locking mechanism may be configured to have a second locking function for locking the open/close operation of the door open/close guiding mechanism immediately before the aforesaid door open/close guiding mechanism closes the door or when it is in a state close thereto.

When performed as described above, it is possible to set the door opened state in two different modes, and either of them cannot only be selected, but also when the operation has been completed in a state in which the door has been opened widely, it is possible to check whether or not the cartridge type recording medium is erroneously inserted only by learning whether or not the door is locked. Thus, the operating efficiency can be improved during maintenance and inspection.

According to the invention, there is adopted a technique in which the aforesaid door guide locking mechanism is configured by: a first stopper member for locking the open/close operation of the door open/close guiding mechanism when the aforesaid door open/close guiding mechanism is at the maximum opening or in a state close thereto; a second stopper member for locking the open/close operation of the door open/close guiding mechanism immediately before the door open/close guiding mechanism closes the door or when it is in a state close thereto; a linking member for setting a linking operation between the first and second stopper members; and a locking-side fixed pedestal for holding the supporting shafts of rotation of the aforesaid first and second stopper members and in which the aforesaid first and second stopper members set an operation restraining area for the supporting arm of the aforesaid door open/close guiding mechanism.

For this reason, two stopper members, first and second, can be driven by one link member driving unit, and therefore, there are advantages that the configuration is not only simplified, but also the operator can easily learn whether or not the cartridge type recording medium is inserted in the reverse direction irrespective of the opening of the door which has been set in accordance with the progress of the operation.

In the invention specified, there has been adopted the technique in which the aforesaid locking mechanism driving unit is configured by: a solenoid, which is a driving force source; a driving force transmission link for transmitting the driving force due to this solenoid to the aforesaid door guide locking mechanism; an original position return spring for returning the driving force transmission link to the original position; and a driving-side fixed pedestal for holding each of these portions.

For this reason, further the door guide locking mechanism can be reliably operated at predetermined timing, thus making it possible to improve the reliability of the entire device.

BRIEF DESCRIPTION OF THE DRAWINGS

FIG. 3(A) is a front view, and FIG. 3(B) is a right side view of FIG. 3(A);

FIG. 9(A) is a sectional view showing the cell portion.

FIG. 10(A) is an explanatory view showing a state when the recording medium (cartridge type) has been inserted in the front-to-back reverse direction.

DETAILED DESCRIPTION OF THE PREFERRED EMBODIMENT

Hereinafter, with reference to the drawings, the description will be made of an embodiment according to the present invention.

Figure 1:
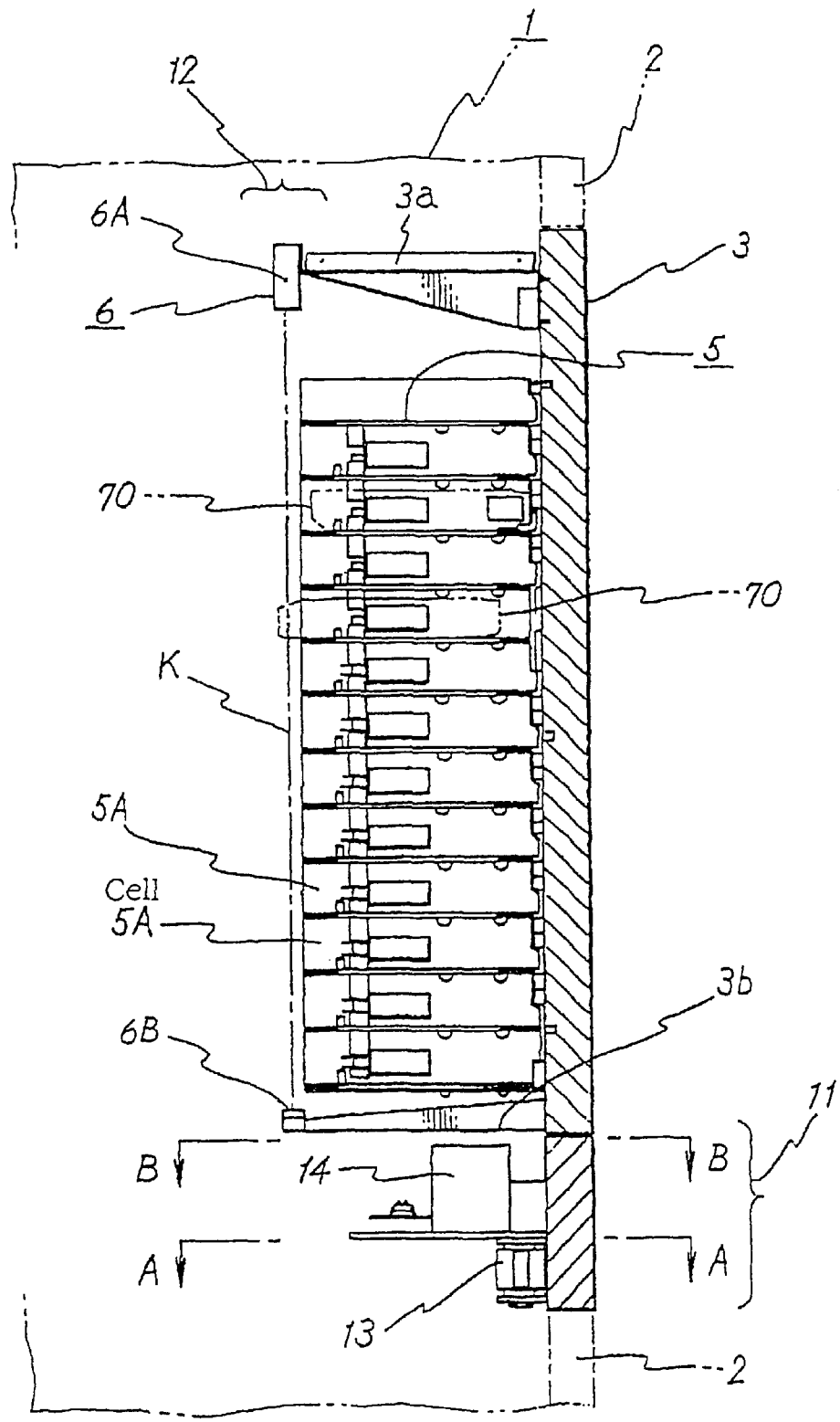
FIG. 1 is a schematic longitudinal sectional view showing the configuration of an embodiment according to the present invention.

FIG. 1 is a schematic longitudinal sectional view according to the present embodiment. In the present embodiment, the description will be made of a wrong insertion prevention device for a cartridge type recording medium applied to a magnetic tape housing storage incorporated in a library device having such configuration as to record in and reproduce among others any magnetic tape from among a plurality of cartridge type magnetic tape, which is cartridge type recording media.

Figure 4:
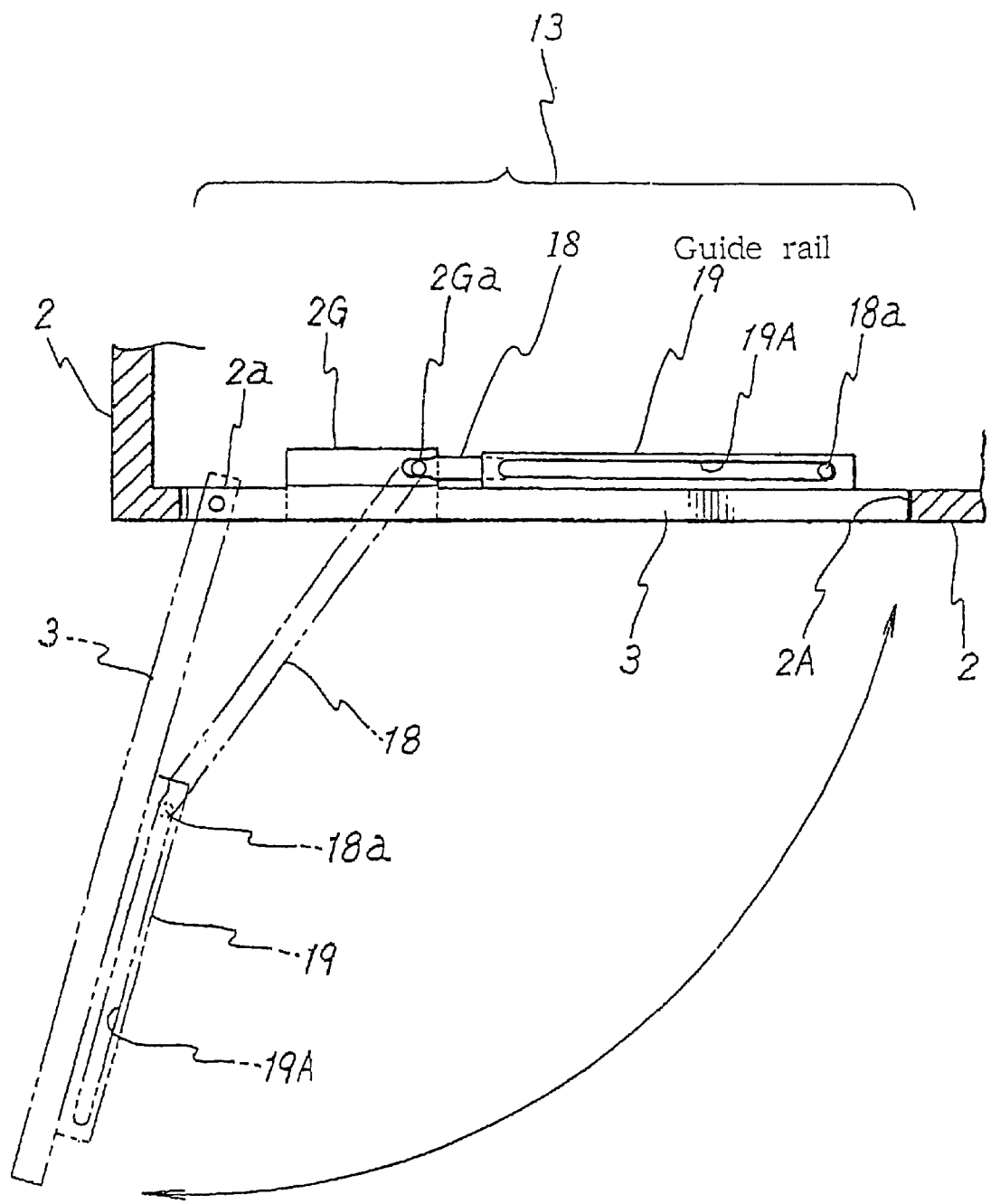
FIG. 4 is a schematic sectional view taken along a line A—A of FIG. 1.

In FIG. 1, a reference numeral 1 denotes a magnetic tape housing storage containing wrong insertion prevention devices for cartridge type recording media therein. Also, a housing (housing case main body) 2 for this magnetic tape housing storage 1 has an entry portion 3 as a door for opening/closing an opening 2a as shown in FIG. 4. This entry portion (door) 3 has one end portion thereof rotatively supported on the housing 2.

On the rear surface side (inner surface side) of the entry portion 3, there is installed a cell main body 5 configured by a plurality of cells 5A for housing cartridge type magnetic tape 70 as a cartridge type recording medium so as to allow it to be fetched respectively. Each of a plurality of cells 5A is stacked for a predetermined number of stages spaced apart a predetermined interval therebetween in the up-and-down direction of the cell main body 5 shown in FIG. 1, and is also arranged for a predetermined number in the horizontal direction.

When the door 3, which is the entry portion, is opened, each cell 5A can be accessed, and an operation of inserting the cartridge type magnetic tape 70 into each cell 5A or discharging it from each cell 5A outwardly can be performed.

On the upper part of the entry portion 3 on the rear surface side (left side of FIG. 1) in FIG. 1, there are provided a plurality of stays 3a, and each stay 3a is provided with an optical sensor 6A comprising a light receiving element and a light emitting element respectively. Also, on the lower part of the entry portion 3 on the rear surface side (left side of FIG. 1) in FIG. 1, there are provided a plurality of stays 3b, and each stay 3b is provided with a reflective mirror 6B respectively. Each optical sensor 6A is arranged for each line of the cell main body 5, and each reflective mirror 6B is arranged so as to oppose to the optical sensor 6A.

The optical sensor 6A and reflective mirror 6B, which have been arranged so as to oppose each other, cooperate with each other to form a detection optical path K for detecting any wrong insertion of the cartridge type magnetic tape 70 into the cell 5A of the corresponding line.

This optical sensor mechanism 6 is configured such that light emitted from the optical sensor 6A is reflected by the reflective mirror 6B and this reflected light is received by the optical sensor 6A again, and the detection optical path K for detecting wrong insertion of the cartridge type magnetic tape 70 is formed as described above between the optical sensor 6A and the reflective mirror 6B. Of these, the optical sensor 6A outputs a signal in conformity with the light receiving intensity. This light receiving intensity of the optical sensor 6A differs depending on when the detection optical path K is intercepted by a portion of the cartridge type magnetic tape 70 erroneously inserted, and when the optical sensor 6A directly receives the light reflected by the reflective mirror 6B.

More specifically, when the cartridge type magnetic tape 70 is inserted into the cell 5A in the reverse direction as described later, the cartridge type magnetic tape 70 is not inserted to the appropriate housing position in the cell 5A, but its one portion protrudes from the cell 5A outwardly. This one portion of the cartridge type magnetic tape 70 protruding from the cell 5A outwardly intercepts the detection optical path K, and at this time, there is outputted, from the optical sensor 6, a signal of a level showing that the cartridge type magnetic tape 70 has been inserted into the cell 5A in the reverse direction.

In contrast, when the cartridge type magnetic tape 70 is inserted to the appropriate housing position in the cell 5A, its one portion does not protrude outwardly from the cell 5A, but the optical sensor 6A directly receives the light reflected by the reflective mirror 6B. At this time, there is outputted, from the optical sensor 6A, a signal having a higher level than the level showing that the cartridge type magnetic tape 70 has been inserted into the cell 5A in the reverse direction.

The signal outputted from the optical sensor 6A is inputted into door locking means 11. This door locking mechanism 11 operates such that the entry portion 3 is not closed in response to the level of the signal outputted from the optical sensor 6A. If the level of the output signal from the optical sensor 6A is a value corresponding to the case where the magnetic tape 70 has been inserted into the cell 5A in the reverse direction, the door locking mechanism 11 operates such that the entry portion 3 is not closed. The configuration of the door locking mechanism 11 will be described in detail later.

Figure 2:
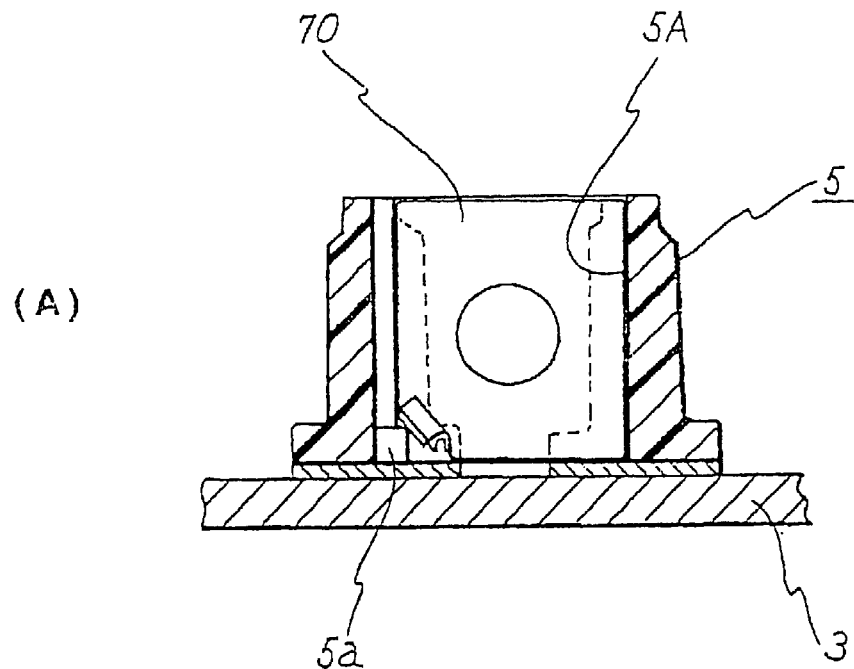
FIG. 2(A) is an explanatory view showing a state in which cartridge type magnetic tape has been normally inserted into a cell in a housing storage 1 of FIG. 1.
FIG. 2(B) is an explanatory view showing a state in which the cartridge type magnetic tape has been inserted into the cell in the reverse direction.
Figure 2:
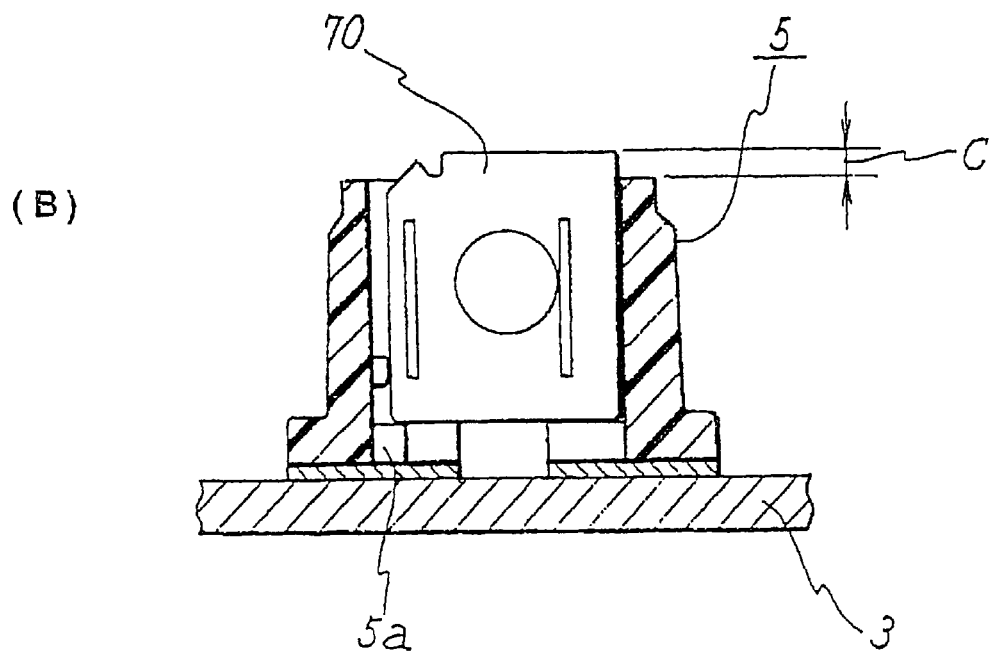

FIG. 2(A) shows a state in which the cartridge type magnetic tape 70 has been normally inserted into a specific cell 5A of the cell main body 5 within the housing storage 1 of FIG. 1. Also, FIG. 2(B) shows a state in which the cartridge type magnetic tape 70 has been inserted into the cell 5A in the reverse direction. Further, FIGS. 3(A) and (B) show an example of the cartridge type magnetic tape 70 of FIG. 1 respectively.

In FIG. 2(A), the cell 5A is mounted to the entry portion 3 as described above, and has frame configuration capable of receiving the cartridge type magnetic tape 70 from one direction. At the interior position (depths) of this cell 5A, there is provided a projection member 5a as a reverse direction insertion regulating member.

Wrong insertion detection means 12 is configured by this projection member (reverse direction insertion regulating member) 5a and the aforesaid optical sensor mechanism 6.

Figure 3:
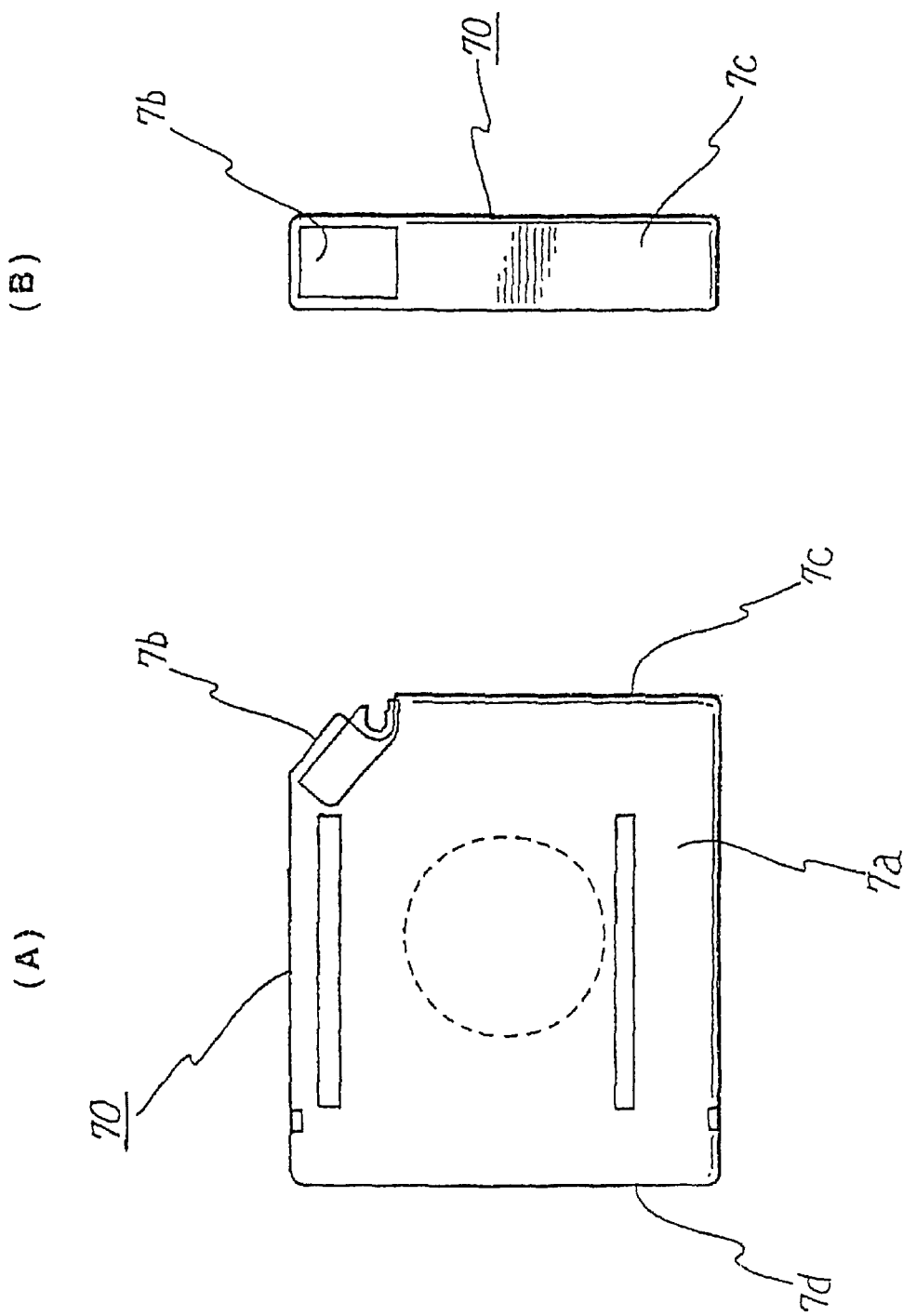
FIG. 3 is a view showing the outer shape of the cartridge type magnetic tape of FIG. 1.

The aforesaid cartridge type magnetic tape 70 has a cartridge 7a containing magnetic tape as shown in FIGS. 3(A) and (B), and an inclined portion 7b is formed at one corner of the cartridge 7a in correspondence with the aforesaid projection member (reverse direction insertion regulating member) 5a.

When this cartridge type magnetic tape 70 is inserted into the cell 5A in a normal state, the cartridge type magnetic tape 70 is inserted to the appropriate housing position within the cell 5A with the tip end portion 7c thereof turned toward the cell 5A side as shown in FIG. 2(A). The cartridge type magnetic tape 70 while inserted to the appropriate housing position is held within the cell 5A with its inclined portion 7b not abutting upon the projection member 5a within the cell 5A.

In contrast, as a case where the cartridge type magnetic tape 70 is erroneously inserted into the cell, there is a case where the cartridge type magnetic tape 70 is inserted into the cell 5A with its rear end portion 7d turned toward the cell 5A side, and a case where the cartridge type magnetic tape 70 is inserted into the cell 5A inside out and with its tip end portion 7c turned toward the cell 5A side.

In the case where the cartridge type magnetic tape 70 is inserted into the cell 5A with its rear end portion 7d turned toward the cell 5A side, since there is provided a projection member 5a within the cell 5A as shown in FIG. 2(B), its rear end 7d bumps against the projection member 5a halfway through the insertion of the cartridge type magnetic tape 70 to thereby prevent the cartridge type magnetic tape from being inserted to a predetermined housing position, and the cartridge type magnetic tape 70 is maintained in the cell 5A with its one portion protruding from the main cell body 5 outwardly.

Assuming the length of the portion of the cartridge type magnetic tape 70 protruding from the cell 5A outwardly to be C as shown in FIG. 2(B), this length C has been set such that the portion protruding comes to the detection optical path K to be formed by the aforesaid optical sensor 6A.

When the cartridge type magnetic tape 70 is thus inserted into the cell 5A in the reverse direction, the cartridge type magnetic tape 70 is held within the cell 5A with its one portion protruding from the cell 5A outwardly, and the portion of the cartridge type magnetic tape 70 protruding from the main cell body 5 outwardly comes to the detection optical path K to be formed by the aforesaid optical sensor 6A. Therefore, by means of the optical sensor 6A, it can be detected that the cartridge type magnetic tape 70 has been inserted into the cell 5A in the reverse direction.

In this respect, even in the case where the cartridge type magnetic tape 70 is inserted into the cell 5A inside out, its tip end portion 7c likewise bumps against the projection member 5a halfway through the insertion of the cartridge type magnetic tape 70 to thereby prevent the cartridge type magnetic tape 70 from being inserted to the predetermined housing position, and the cartridge type magnetic tape 70 is held in the cell 5A with its one portion protruding from the main cell body 5 outwardly. Therefore, it is also possible to detect such wrong insertion as to insert the cartridge type magnetic tape 70 into the cell 5A inside out.

Also, in the case where the cartridge type magnetic tape 70 is inserted into the cell 5A with its rear end portion 7d turned toward the cell 5A side and it is detected that one portion of the cartridge type magnetic tape 70 has protruded outwardly from the main cell body 5, there is also included the case where the cartridge type magnetic tape 70 is inserted into the cell 5A inside out and its one portion has protruded outwardly from the main cell body 5.

Next, the description will be made of door locking means 11.

This door locking means 11 has a closing operation inhibiting function, which operates when the aforesaid wrong insertion detection means 12 detects wrong insertion of the cartridge type magnetic tape 70, for inhibiting a closing operation of the door (entry portion) 3, in an opened state, for the housing case main body 2, which is a housing.

In order to perform the closing operation inhibiting function of this door locking means 11, the door locking means 11 is configured by: a door open/close guiding mechanism 13 for guiding the door (entry portion) 3 on opening or closing by reciprocally pivoting within the range of a predetermined opening with a door supporting shaft 2a, at which one end portion of the door 3 is held by the housing 2, being centered; a door guide locking mechanism 14 placed side by side with this door open/close guiding mechanism 13, for locking the door open/close guiding operation by the a door open/close guiding mechanism 13 on the basis of wrong insertion information from the optical sensor mechanism 6 of the aforesaid wrong insertion detection means 12; and a lock mechanism driving unit 15 for urging the operation of the door guide locking mechanism 14 at predetermined timing.

Of these, the aforesaid door open/close guiding mechanism 13 is, as shown in FIG. 4, configured by: a supporting arm 18, one end portion of which is rotatively supported on the housing case main body 2 and the other end portion of which engages with the aforesaid door 3, for rotating by following the open/close operation of the door 3; and a guide rail 19 for guiding the tip end portion of the supporting arm 18 on moving along the door.

The door open/close guiding mechanism 13 will be further described in detail. In the door open/close guiding mechanism 13 shown in FIG. 4, the aforesaid guide rail 19 is fixedly installed on the rear surface side (inner side) of the door 3 supported by the door supporting shaft 2a provided on the housing 2 side of the housing storage 1 so as to allow the opening 2A to be opened and closed. This guide rail 19 is formed with a slot 19A along the length of the rail.

For this reason, the maximum opening angle of the entry portion 3 is regulated by this guide rail 19 and the aforesaid supporting arm 18.

One end of the supporting arm 18 is rotatively supported on an arm supporting shaft 2Ga mounted on a fixed plate 2G of the aforesaid housing 2. This arm supporting shaft 2Ga is provided spaced apart a predetermined interval on the right side of the door supporting shaft 2a in FIG. 4. At the other end (tip end portion) of the supporting arm 18, there is provided a stopper shaft 18a which moves along a slot 19A while engaging with the slot 19A in the aforesaid guide rail 19.

With the opening/closing of the door 3 as the entry portion, the supporting arm 18 rotates around the arm supporting shaft 2Ga, and the stopper shaft 18a at the tip end portion of the aforesaid supporting arm 18 moves along the slot 19A in the guide rail 19. In this manner, the opening/closing operation of the door 3 is guided by means of the aforesaid door open/close guiding mechanism 13, and the maximum opening angle of the door 3 is regulated by the door open/close guiding mechanism 13 comprising the supporting arm 18 and the guide rail 19.

Next, with reference to FIGS. 5 to 8, the description will be made of the aforesaid door guide locking mechanism 14.

This door guide locking mechanism 14 has a first locking function for locking the closing operation of the door open/close guiding mechanism 13 when the aforesaid door open/close guiding mechanism 13 is at the maximum opening or in a state close thereto. Also, this door guide locking mechanism 14 has a second locking function for locking the closing operation of the door open/close guiding mechanism 13 immediately before the aforesaid door open/close guiding mechanism 13 closes the door 3 or when it is in a state close thereto.

In order to perform this first or second locking function, this door guide locking mechanism 14 is configured by: a first stopper member 21 for locking the closing operation of the door open/close guiding mechanism 13 when the aforesaid door open/close guiding mechanism 13 is at the maximum opening or in a state close thereto; a second stopper member 22 for locking the closing operation of the door open/close guiding mechanism 13 immediately before the aforesaid door open/close guiding mechanism 13 closes the door 3 or when it is in a state close thereto; a linking member 23 for setting an linking operation between these first and second stopper members 21 and 22; and a locking-side fixed pedestal 24 for holding supporting shafts of rotation 21a and 22a of the aforesaid first and second stopper members 21 and 22 and in which the first and second stopper members 21 and 22 set an operation restraining area for the supporting arm 18 (See FIG. 4) of the aforesaid door open/close guiding mechanism 13.

This locking-side fixed pedestal 24 is disposed substantially in parallel with the aforesaid linking member 23, and is fixedly provided on the door 3.

Figure 5:
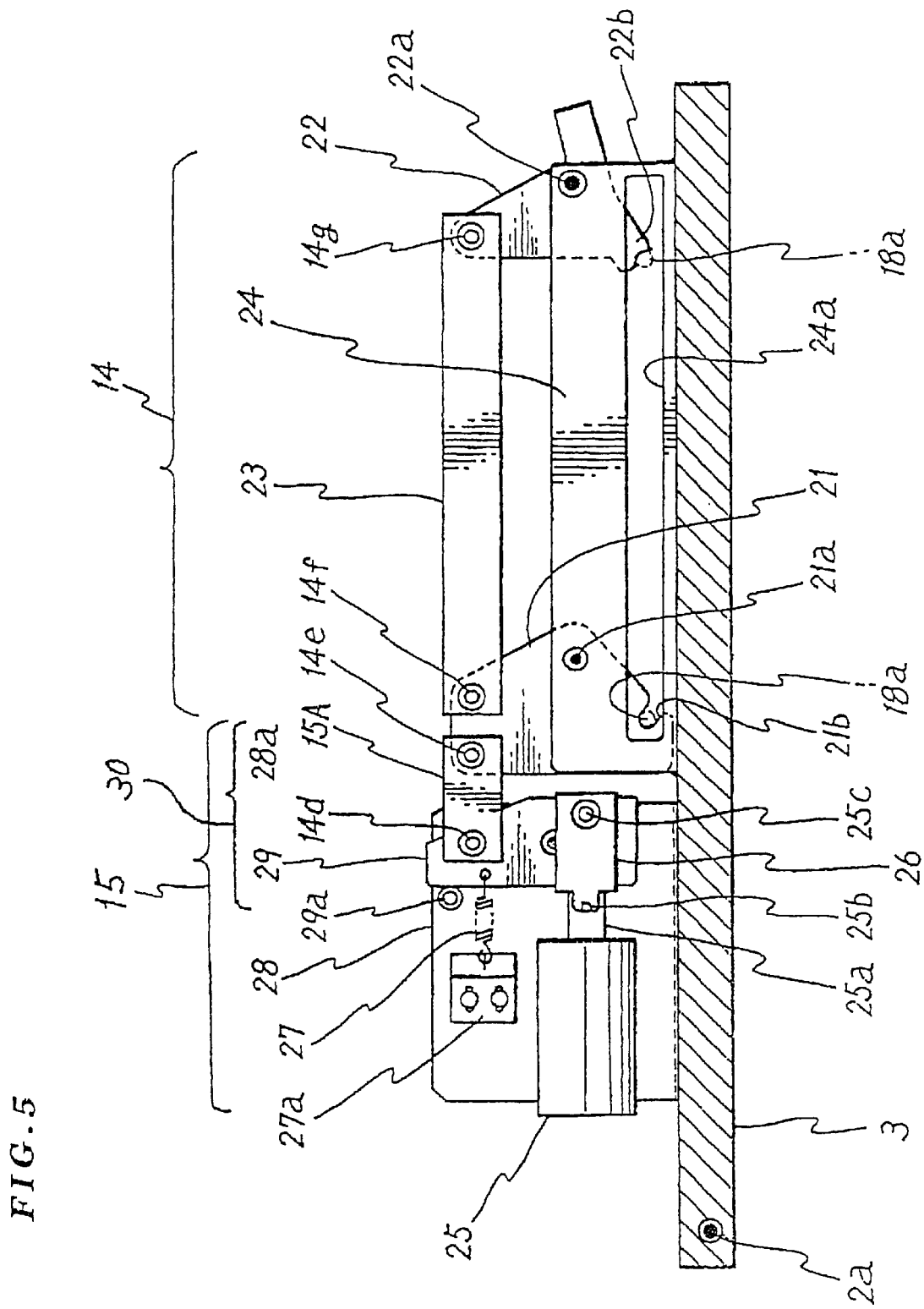
FIG. 5 is an explanatory view showing door locking means as viewed along a line B—B of FIG. 1.

FIG. 5 shows the operating state of the door guide locking mechanism 14, that is, a locked state in which the operation of the aforesaid door open/close guiding mechanism 13 has been locked by urging the linking member 23 of the aforesaid door guide locking mechanism 14 when the aforesaid locking mechanism driving unit 15 is started.

Next, the description will be made of a lock mechanism driving unit 15 placed side by side with the door guide locking mechanism 14.

This locking mechanism driving unit 15 is, as described above, installed on the inner side (rear surface side) of the door 3, and is placed side by side with the aforesaid door guiding locking mechanism 14. (The aforesaid link member 23), that is, this locking mechanism driving unit 15 is, as shown in FIG. 5, configured by: a solenoid 25, which is a driving force source; a driving force transmission link 26 for transmitting driving force due to the solenoid 25 to the aforesaid door guide locking mechanism 14; an original position spring 27 for returning this driving force transmission link 26 to the original position; and a driving-side fixed pedestal 28 for holding each of these portions. A reference numeral 27A denotes a spring force adjusting mechanism for adjusting the tensile force of the original position spring 27.

The driving-side fixed pedestal 28 is located at the left end portion in the FIG. 5 on the internal side of the door 3, and is arranged in the left-and-right direction of the FIG. 5. The solenoid 25 is driven by a driving circuit (not shown), and this driving circuit ON/OFF drives the solenoid 25 on the basis of an output signal from the aforesaid optical sensor 6A and a forced switch (not shown) to be described later. An output shaft 25a of the solenoid 25 is connected to one end portion of an output shaft connecting link 26 through a connecting shaft 25b.

The other end portion of the output shaft connecting link 26 is connected to a change-direction member 29 through another connecting shaft 25c. This change-direction member 29 operates with a supporting shaft 28a provided on the driving-side fixed pedestal 28 as the center of rotation, and functions so as to change the direction of operation of the output shaft 25a of the aforesaid solenoid 25 substantially by 180°. In FIG. 5, when the output shaft 25a of the solenoid 25 moves in the left direction, the change-direction member 29 is to operate so as to rotate in the clockwise direction.

The output of the solenoid 25 whose direction has been changed by this change-direction member 29 is transmitted to the aforesaid first and second stopper members 21 and 22 through a power transmission link member 15A. A reference numeral 14d denotes a connecting shaft between the power transmission link member 15A and the change-direction member 21. Also, a reference numeral 14e denotes a connecting shaft between the driving force transmission link 15A and the first stopper member 21.

A driving force transmission link 30 is configured by: this change-direction member 29; the output shaft connecting link 26; the power transmission link member 15A; and the driving-side fixed pedestal 28 for holding them.

Further, the aforesaid original position spring 27 is used to always rotate the aforesaid change-direction member 29 in an anti-clockwise direction. In the present embodiment, a coiled spring is used, is spanned between the aforesaid driving-side fixed pedestal 28 and the change-direction member 29, and is installed in a state in which the upper end portion of the change-direction member 29 in FIG. 5 is always pulled in the left direction of the same figure.

Thereby, when the operation of the solenoid 25 is released, the original position return spring 27 operates to rotate the change-direction member 29 in the anti-clockwise direction, whereby the change-direction member 29 will be returned to the original position.

The aforesaid door guide locking mechanism 14 will be further described in detail.

A transmission driving force from the power transmission link member 15A is transmitted to the first stopper member 21 through the connecting shaft 14e.

This first stopper member 21 is rotatively supported by a supporting shaft 21a. This supporting shaft 21a is held by a locking-side driving pedestal 24 provided adjacent the driving-side fixed pedestal 29. On this first stopper member 21, there is formed an U-groove 21b to engage with a stopper shaft 18a, so as to be able to be released, which has been fixedly installed to the tip end portion of the aforesaid supporting arm 18 (See FIG. 4). Also, to the upper end portion of the first stopper member 21 in FIG. 5, there is connected one end of the linking member 23 through a connecting shaft 14f. To the other end of the linking member 23, there is connected the aforesaid second stopper member 22 through a connecting shaft 14g.

This second stopper member 22 is rotatively supported by a supporting shaft 22a fixed to the locking-side driving pedestal 24. To this second stopper member 22, there is formed an abutting concave portion 22b which abuts upon the stopper shaft 18a of the aforesaid supporting arm 18 (See FIG. 4).

On the locking-side driving pedestal 24, there is formed a slot 24A having a predetermined width (width of, for example, about three times as large as the diameter of the stopper shaft 18a) for receiving the stopper shaft 18a along the reciprocal movement of the stopper shaft 18a. This slot 24A is arranged to oppose to the aforesaid slot 19A of the guide rail 19.

When any reversely-oriented insertion of the cartridge type magnetic tape 70 is detected by the optical sensor 6A as described above, the solenoid 25 is turned OFF by the driving circuit as shown in FIG. 5. With this OFF-operation of the solenoid 25, the stopper member 22 is positioned in such a manner that its abutting portion 22b is exposed in the slot 24A in the locking-side driving pedestal 24.

When, for example, the entry portion 3 is closed in this state, the stopper shaft 18a moves along the slot 19A of the guide rail 19, and the stopper shaft 18a bumps against the abutting portion (U groove) 21b of the first stopper member 21 in the course of closing the entry portion 3. Thus, the entry portion 4 is inhibited from being completely closed.

Aside from the foregoing, with the OFF operation of the solenoid 25, the first stopper member 21 is positioned so as to allow its U groove 21b to be exposed in the slot 24A in the locking-side driving pedestal 24. When the entry portion 3 is opened in this state and the stopper shaft 18a is moved to the position of the U groove 21b in the first stopper member 21, the stopper shaft 11 enters the U-groove 21b in the first stopper member 21 to be engaged. Thus, the entry portion 4 is maintained in an opened state.

When the entry portion 4 thus opened is maintained in that state, it is necessary to turn ON the forced switch. While the forced switch is turned ON, the configuration is arranged such that an output signal from the optical sensor 6A is ignored (even 0).

Figure 6:
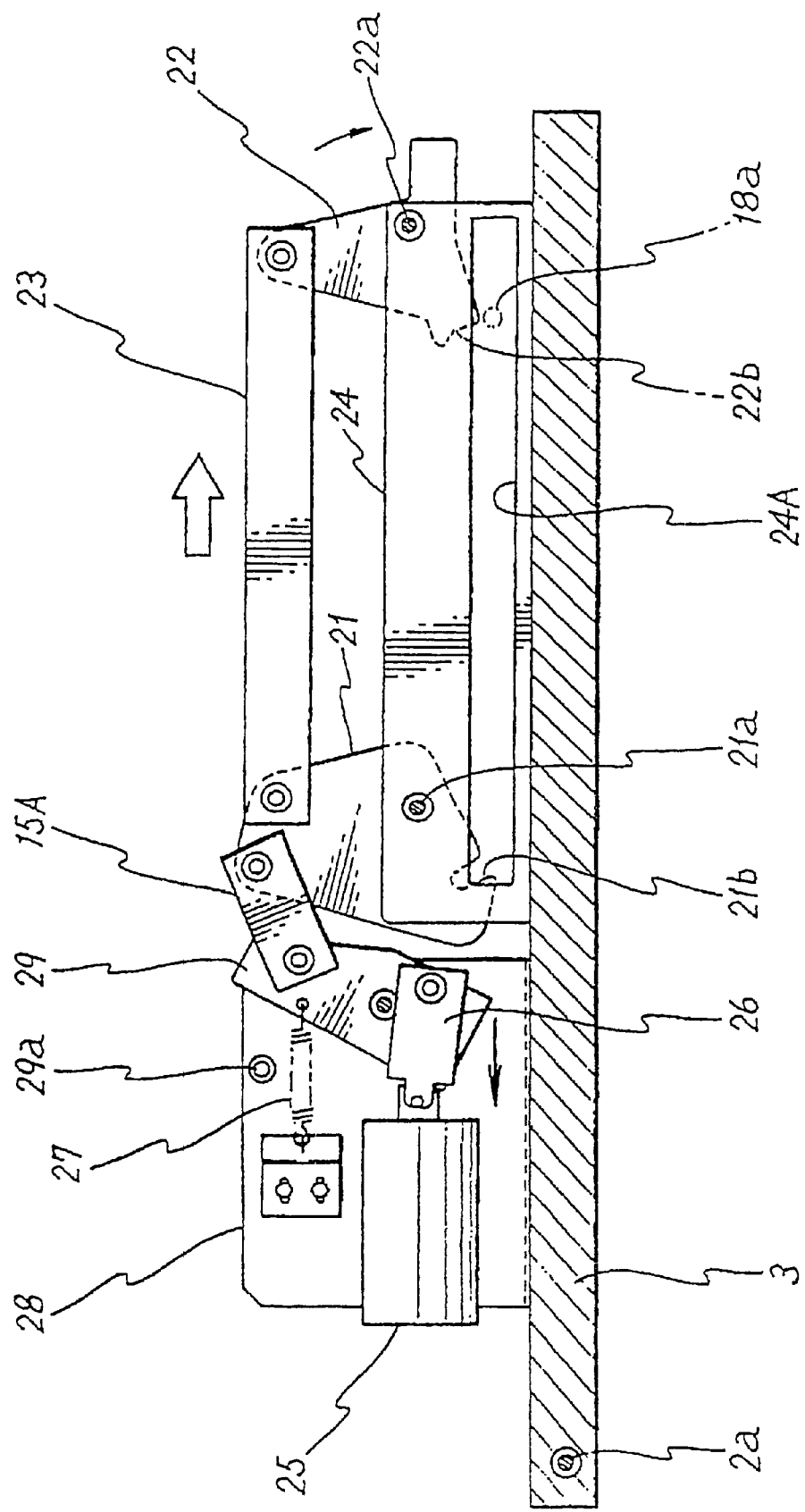
FIG. 6 is an explanatory view showing an unlock operating state of the door locking means of FIG. 5.

In contrast, when any reversely-oriented insertion of the cartridge type magnetic tape 70 is not detected by the optical sensor 6A (that is, when the cartridge type magnetic tape 70 is inserted in a normal state), the solenoid 25 is turned ON by the driving circuit as shown in FIG. 6, and with the ON operation of the solenoid 25, the second stopper member 22 is rotated to such a position that its abutting portion 22b retracts from the slot 24A of the locking-side driving pedestal 24. In this manner, when the entry portion 3 is closed, the stopper shaft 18a can completely close the entry portion 3 without bumping against the abutting portions 21b and 22b of the first and second stopper members 21 and 22.

By turning ON/OFF the solenoid 25 in accordance with the result of the optical sensor 6A in this manner, it is possible to inhibit the entry portion 3 from being completely closed and also to release it.

Next, the description will be made of the operation from insertion of the cartridge type magnetic tape 70 into each cell 5 in the entry portion 3 to closing of the entry portion 3.

Figure 7:
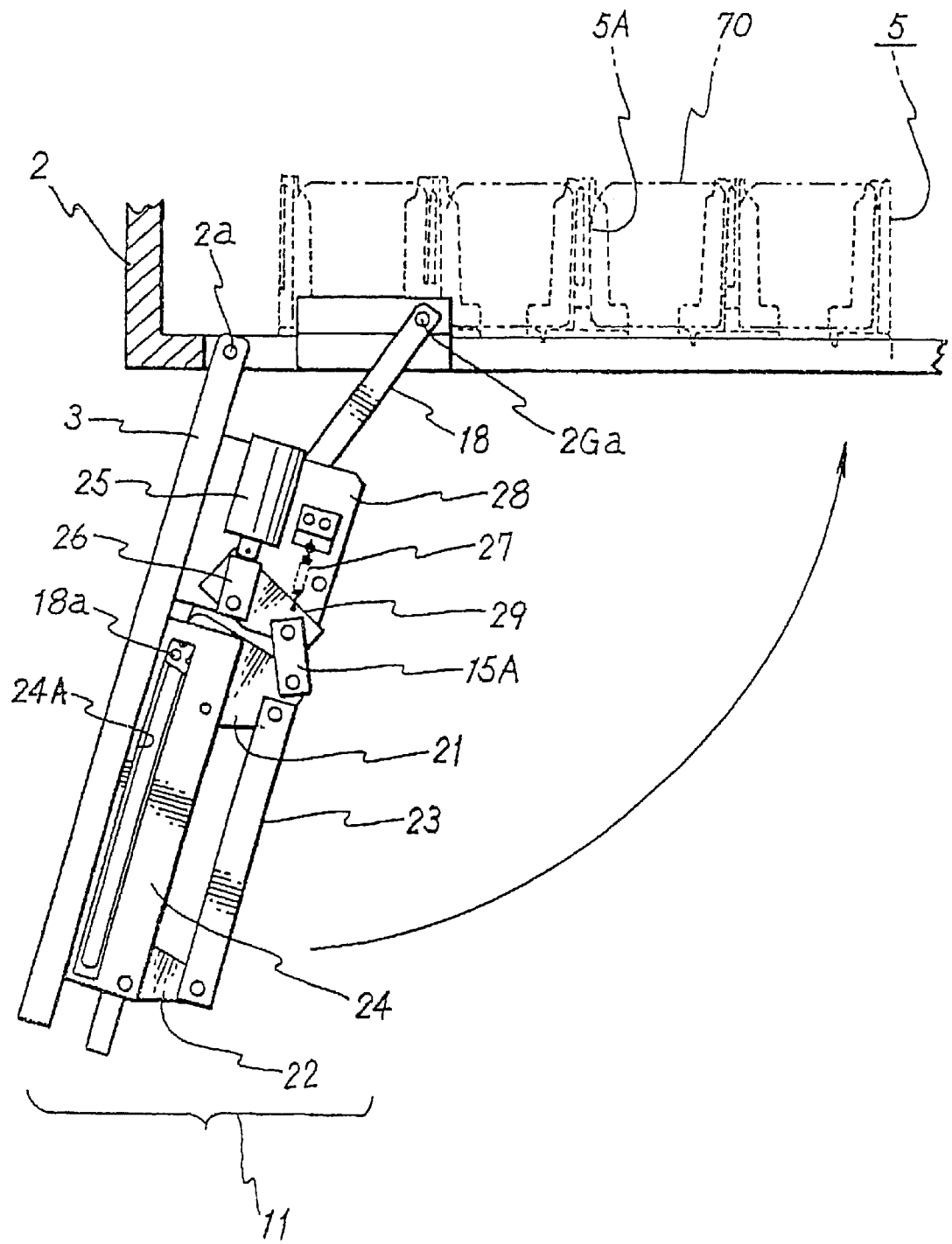
FIG. 7 is a structural view showing the state in which the entry portion of FIG. 1 has been opened.
Figure 8:
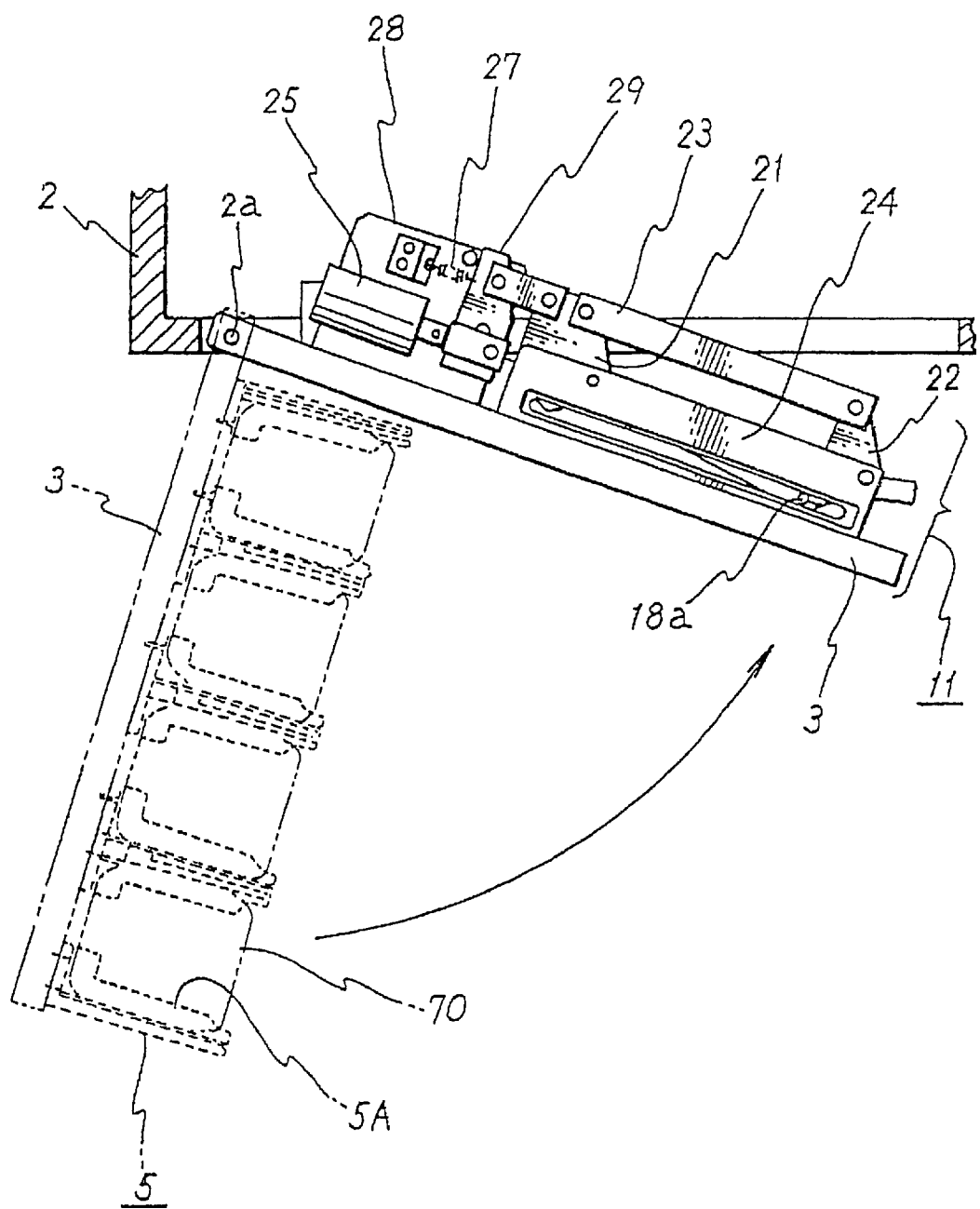
FIG. 8 is a structural view showing the state in which the entry portion of FIG. 1 is being closed.
Figure 9:
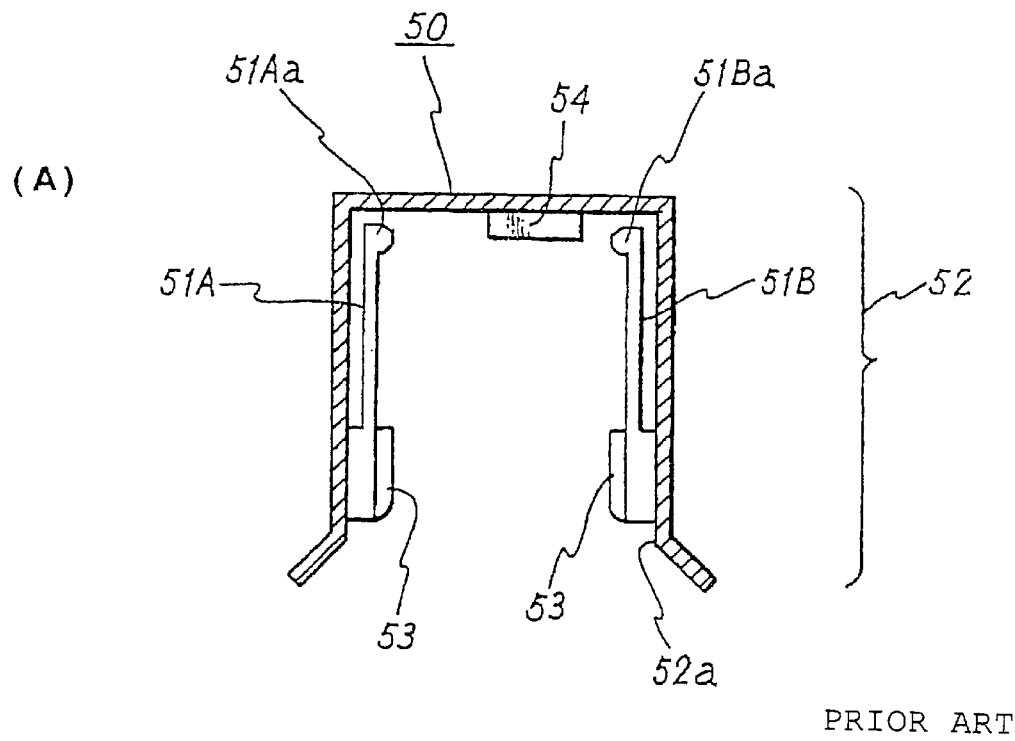
FIGS. 9(A) and (B) are views showing a conventional example.
FIG. 9(B) is an explanatory view showing the case where a recording medium (cartridge type) has been inserted into the cell portion of FIG. 9(A)
Figure 9:
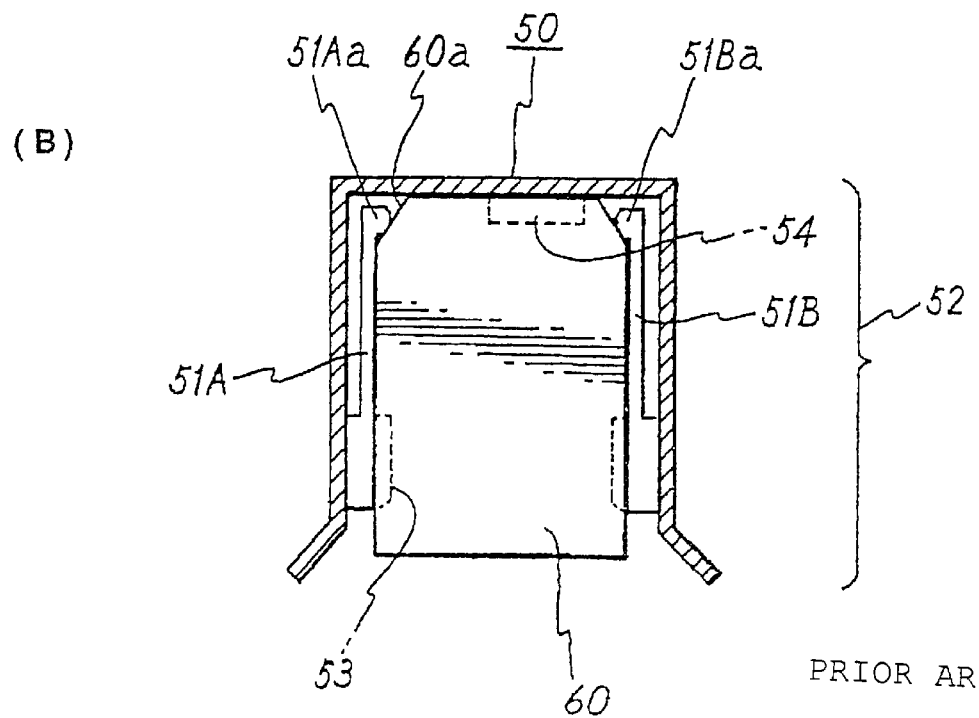
Figure 10:
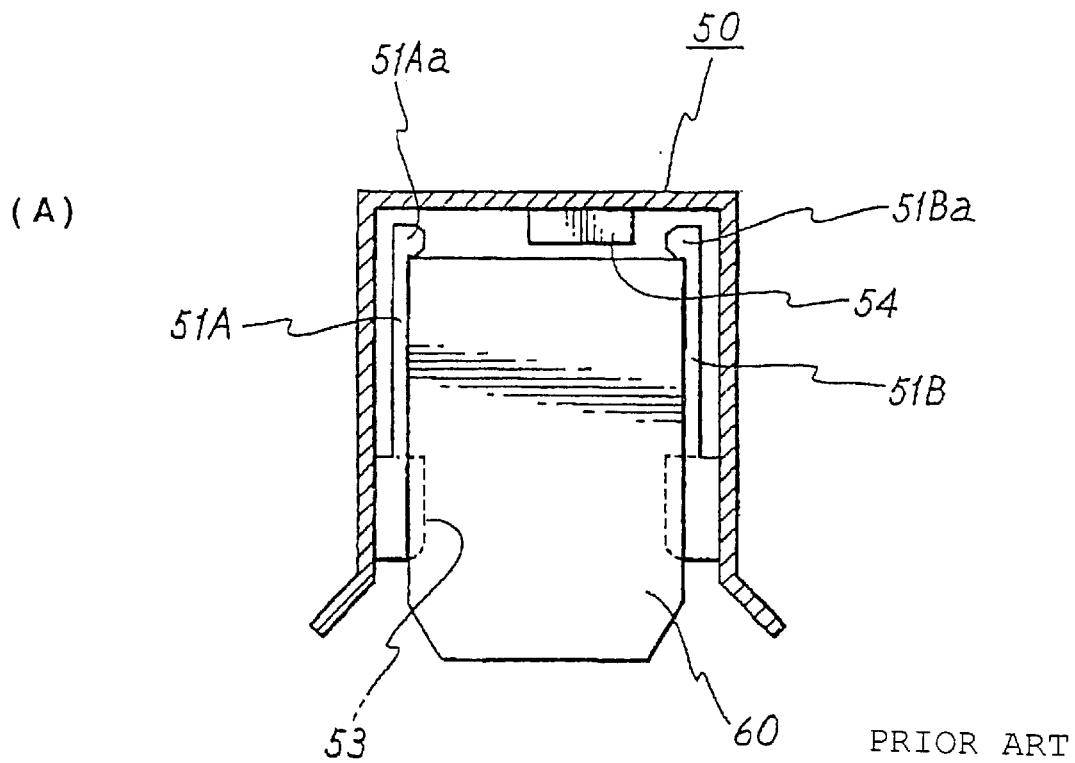
FIGS. 10(A) and (B) are explanatory views showing the operation of the conventional example shown in FIG. 9.
FIG. 10(B) is an explanatory view showing a state when the recording medium (cartridge type) has been obliquely inserted.
Figure 11:
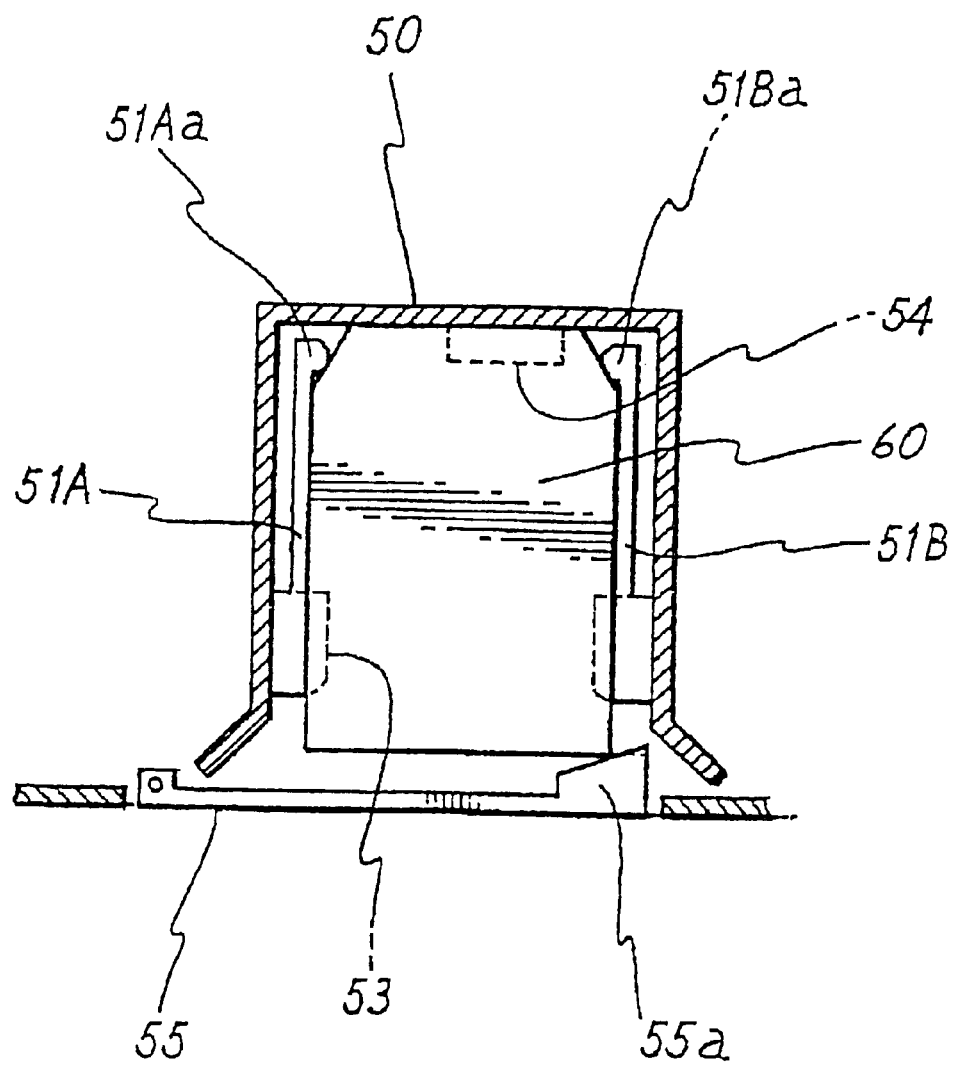
FIG. 11 is an explanatory view showing another conventional example.

FIG. 7 is an explanatory view showing a state in which the entry portion 3 of FIG. 1 has been opened. Also, FIG. 8 is an explanatory view showing a state in which the entry portion (door) 3 is being closed in a state in which the cell main body 5 has been opened.

In case of housing the cartridge type magnetic tape 70 in each cell 5 in the entry portion 3 or exchanging, when the entry portion (door) 3 is first opened as shown in FIG. 7, each cell 5A can be accessed from the outside. At this time, the entry portion (door) 3 can be opened within an angular range to be regulated by the door open/close guiding mechanism 13.

Now, when the aforesaid forced switch is turned ON in a state in which the entry portion (door) 3 has been opened, the solenoid 25 is turned OFF, and the first stopper member 21 is positioned such that its U-groove 21b portion is exposed within the slot 24A in the locking-side driving pedestal 24. When the entry portion (door) 3 is opened to the maximum angle position as shown in FIG. 7 in this state, the stopper shaft 18a enters the U-groove 18a in the stopper member 18 to be engaged.

Thus, the entry portion 3 is maintained in an opened state. Therefore, there is no possibility that the entry portion 3 is carelessly closed during the insertion or fetching of the cartridge type magnetic tape 70, but it is possible to reliably secure access to each cell 5A from the outside.

Then, the cartridge type magnetic tape 70 is inserted into each cell 5A, or the cartridge type magnetic tape 70 is fetched from each cell 5A and a new cartridge type magnetic tape 70 is inserted. During the insertion or fetching of this cartridge type magnetic tape 70, the detection optical path K of the optical sensor 6A is intercepted by the cartridge type magnetic tape 70 to be inserted or fetched. Since, however, an output signal from the optical sensor 6A at this time is ignored, it is possible to avoid such a condition that the solenoid 25 wastefully repeats the ON/OFF operation.

When the insertion or fetching of this cartridge type magnetic tape 70 is completed to close the entry portion 3, the aforesaid forced switch is turned OFF, and the solenoid 25 is turned ON once. This operation releases the engagement between the U-groove 21a in the first stopper member 21 and the stopper shaft 18a of the supporting arm 18, the entry portion 3 enters a state in which it can be closed, and an output signal from the optical sensor 6A can be received.

Then, the entry portion 3 is closed. If there is any cartridge type magnetic tape 70 inserted in the reverse direction among cartridge type magnetic tape 70 inserted into each cell 5A, the housing position of the cartridge type magnetic tape 70 inserted in the reverse direction is regulated by the projection portion 5a on the wrong insertion detection means 12 side so that a portion of the cartridge type magnetic tape 70 protrudes from the cell 5A. Therefore, the portion protruding from this cell 5A intercepts the detection optical path K of the optical sensor 6A, and a signal indicating reversely-oriented insertion of the cartridge type magnetic tape 70 is outputted from the optical sensor 6A.

The output signal from this optical sensor 6A turns OFF the solenoid 25, and this OFF operation positions the second stopper member 22 such that its abutting portion 22b is exposed in the slot 24A in the locking-side driving pedestal 24. The stopper shaft 18a, which moves when the entry portion (door) 3 is closed, bumps against the abutting portion 22b of the second stopper member 22 as shown in FIG. 8 to thereby inhibit the entry portion 3 from being completely closed.

If there is any cartridge type magnetic tape 70 inserted in the reverse direction in this manner, the entry portion 3 is inhibited from being completely closed, and therefore, the user can learn that there is a cartridge type magnetic tape 70 inserted in the reverse direction. When it is learned that there is this cartridge type magnetic tape 70 inserted in the reverse direction, the entry portion (door) 3 is opened again, and there is performed an operation to fetch the cartridge type magnetic tape 70 inserted in the reverse direction for inserting it in a normal state over again. This operation enables the reversely-oriented insertion of the cartridge type magnetic tape 70 into the cell 5A to be reliably prevented.

In contrast, when any reversely-oriented insertion of the cartridge type magnetic tape 70 is not detected by the optical sensor 6A, that is, when the cartridge type magnetic tape 70 has been inserted in a normal state, the solenoid 25 is maintained in an ON-operated state. When the solenoid 25 is in the ON-operated state, the second stopper member 22 is rotated to such a position that its abutting portion 22b retracts from the slot 24A of the locking-side driving pedestal 24. In this manner, when the entry portion 3 is closed, the stopper shaft 18a can completely close the entry portion 3 without bumping against the abutting portion 22b of the second stopper member 22.

In this respect, in the present embodiment, the configuration is arranged such that the first stopper member 21 is moved by turning ON/OFF the solenoid 25 using the aforesaid forced switch to thereby maintain the entry portion 3 in an open state, but in place of this configuration, the configuration can be also arranged such that the first stopper member 21 can be automatically moved by detecting that the entry portion 3 is opened and ON/OFF driving the solenoid 25.

Also, it may be possible to independently provide a mechanism for operating the second stopper member 22 for causing the entry portion 3 not to be closed, and a mechanism for operating the first stopper member 21 for maintaining the entry portion 3 in an opened state respectively.

Further, the mechanism, according to the present embodiment, for operating the second stopper member 22 for causing the entry portion 3 not to be closed is not limited to the aforesaid configuration, but may be configured using another linking mechanism.

Further, in the present embodiment, there has been disclosed the wrong insertion prevention mechanism in the housing storage for cartridge type magnetic tape, and this wrong insertion prevention mechanism is applicable to another housing storage for cartridge type recording medium. In this case, there can be provided a member suitable for the outside shape of another cartridge type recording medium, for regulating the position of the cell at the time of wrong insertion.

Further, in the present embodiment, there has been shown the wrong insertion prevention mechanism for a cartridge type recording medium for the housing storage 1 of such configuration that the cell main body 5 is provided on the rear surface of the entry (door) portion 3, and the present embodiment is not limited to the housing storage 1 of such configuration, but the wrong insertion prevention mechanism for a cartridge type recording medium according to the present embodiment is applicable to any housing storage having a plurality of cells and a door for opening and closing an opening for inserting the cartridge type recording medium into the cell from the outside and discharging.

As described above, according to the present invention, when the door is opened and the cartridge type recording medium is erroneously inserted into the cell in the reverse direction, the reversely-oriented insertion of the cartridge type recording medium into the cell is first detected by the wrong insertion detection means, and the door is caused not to be closed by the door locking means. Therefore, it can be reliably detected that the cartridge type recording medium has been inserted into the cell in the opposite direction, and as a result, it is possible to supply an unprecedented, excellent wrong insertion prevention mechanism for cartridge type recording medium capable of reliably preventing the cartridge type recording medium from being inserted into the cell in the opposite direction.

Also, according to the present invention, in the case where the aforesaid door locking means is configured by: a door open/close guiding mechanism for guiding the door on opening or closing by reciprocally pivoting within the range of a predetermined opening with one end thereof as a fulcrum of rotation; a door guide locking mechanism placed side by side with this door open/close guiding mechanism, for locking the door guiding operation by the door open/close guiding mechanism on the basis of wrong insertion information from the aforesaid wrong insertion detection means; and a locking mechanism driving unit for urging the operation of the door guide locking mechanism at predetermined timing, it is possible to reliably cause the door not to be closed when the reversely-oriented insertion of the cartridge type recording medium has been detected because these components can be formed in comparatively simple configuration.

Further, according to the present invention, in the case where when the cartridge type recording medium has been inserted into the cell in the reverse direction, the configuration is arranged such that the housing position of the cartridge type recording medium into the cell is regulated by the reverse direction insertion prevention member in such a manner that one portion of the cartridge type recording medium protrudes from the cell, and that the one portion of the cartridge type recording medium protruded from the cell is detected by the wrong insertion detection means, it is possible to detect immediately and reliably that the cartridge type recording medium has been inserted into the cell in the reverse direction.

Further, according to the present invention, the aforesaid wrong insertion detection means is configured by an optical sensor arranged so as to detect one portion of the cartridge type recording medium protruded from the cell, whereby it is possible to detect one portion of the cartridge type recording medium protruded from the cell in simple configuration.

Further, according to the present invention, if there is provided door-open state maintaining means comprising the door open/close guiding mechanism and the door guide locking mechanism, the door can be maintained in a state in which it has been opened to a predetermined position when the door is opened to the predetermined position, and therefore, when the cartridge type recording medium is inserted into each cell from the outside and is discharged from each cell, it is possible to facilitate this insertion or discharge operation.

Further, even for any housing storage of such configuration that the cells are provided on the rear surface of the door, it is possible to reliably prevent the cartridge type recording medium from being inserted into the cell in the reverse direction.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-359660 (Filed on Dec. $17^{th}$, 1998) including specification, claims, drawings and summary are incorporated herein by reference in its entirety.

What is claimed is:

1. A wrong insertion prevention device for a cartridge type recording medium, comprising:

a wrong insertion detector placed proximate a cell main body for housing a plurality of cartridge type recording media, for detecting wrong insertion of any of said cartridge type recording media; and a door locking apparatus for operating on the basis of output information from said wrong insertion detector to regulate a closing operation of a door for a housing case main body which has been opened during an insertion operation of said recording medium, said wrong insertion detector being configured by:

a reverse direction insertion regulating member protrusion corresponding to a cutout in the cartridge type recording medium installed within each cell of said cell main body; and an optical sensor mechanism for detecting a portion of any said cartridge type recording medium that is misoriented in one of the cells so that the cutout in each said misoriented recording medium is not aligned with a corresponding said protrusion, causing the misaligned recording medium to protrude outwardly.

2. The wrong insertion prevention device for a cartridge type recording medium according to claim 1, wherein said door locking apparatus has a closing operation inhibiting function, which, when said wrong insertion detector detects wrong insertion of said cartridge type recording medium, operates to inhibit said door for said housing case main body, which has been opened, from being closed.

3. The wrong insertion prevention device for a cartridge type recording medium according to claim 2, wherein said door locking apparatus is configured by: a door open/close guiding mechanism for guiding said door on opening or closing by reciprocally pivoting said door within the range of a predetermined opening with one end thereof as a fulcrum of rotation; a door guide locking mechanism placed side by side with said door open/close guiding mechanism, for locking the door open/close guiding mechanism on the basis of wrong insertion information from said wrong insert-on detector; and a lock mechanism driving unit for urging the operation of said door guide locking mechanism at predetermined timing.

4. The wrong insertion prevention device for a cartridge type recording medium according to claim 3, wherein said door guide locking mechanism has a first locking function for locking the open/close operation of said door open/close guiding mechanism when said door is at a maximum opening or in a state close thereto.

5. The wrong insertion prevention device for a cartridge type recording medium according to claim 3, wherein said locking mechanism driving unit is configured by: a solenoid, which is a driving force source; a driving force transmission link for transmitting the driving force due to said solenoid to said door guide locking mechanism; an original position return spring for returning said driving force transmission link to the original position; and a driving-side fixed pedestal for holding the solenoid, the driving force transmission link, and the original position return spring.

6. The wrong insertion prevention device for a cartridge type recording medium according to claim 1, wherein said door locking apparatus is configured by: a door open/close guiding mechanism for guiding said door on opening or closing by reciprocally pivoting said door within the range of a predetermined opening with one end thereof as a fulcrum of rotation; a door guide locking mechanism placed side by side with said door open/close guiding mechanism, for locking the door open/close guiding mechanism on the basis of wrong insertion information from said wrong insertion detector; and a lock mechanism driving unit for urging the operation of said door guide locking mechanism at predetermined timing.

7. The wrong insertion prevention device for a cartridge type recording medium according to claim 6, wherein said door guide locking mechanism has a first locking function for locking the open/close operation of said door open/close guiding mechanism when said door is at a maximum opening or in a state close thereto.

8. The wrong insertion prevention device for a cartridge type recording medium according to claim 6, wherein said locking mechanism driving unit is configured by: a solenoid, which is a driving force source; a driving force transmission link for transmitting the driving force due to said solenoid to said door guide locking mechanism; an original position return spring for returning said driving force transmission link to the original position; and a driving-side fixed pedestal for holding the solenoid, the driving force transmission link, and the original position return spring.

9. A wrong insertion prevention device for a cartridge type recording medium, comprising:

a wrong insertion detector placed proximate a cell main body for housing a plurality of cartridge type recording media, for detecting wrong insertion of any of said cartridge type recording media; and a door locking apparatus for operating on the basis of output information from said wrong insertion detector to regulate a closing operation of a door for a housing case main body which has been opened during an insertion operation of said recording medium, said wrong insertion detector being configured by:

a reverse direction insertion regulating member protrusion corresponding to a cutout in the cartridge type recording medium installed within each cell of said cell main body; and an optical sensor mechanism for detecting a portion of any said cartridge type recording medium that is misoriented in one of the cells so that the cutout in each said misoriented recording medium is not aligned with a corresponding said protrusion causing the misaligned recording medium to protrude outwardly;

wherein said door locking apparatus is configured by: a door open/close guiding mechanism for guiding said door on opening or closing by reciprocally pivoting said door within the range of a predetermined opening with one end thereof as a fulcrum of rotation; a door guide locking mechanism placed side by side with said door open/close guiding mechanism, for locking the door open/close guiding mechanism on the basis of wrong insertion information from said wrong insertion detector; and a lock mechanism driving unit for urging the operation of said door guide locking mechanism at predetermined timing;

wherein said door open/close guiding mechanism is configured by: a supporting arm, one end portion of which is rotatively supported on said housing case main body, and the other end of which engages with said door and rotates by following the open/close operation of said door; and a guide rail for guiding the tip end portion of said supporting arm for movement along said door.

10. The wrong insertion prevention device for a cartridge type recording medium according to claim 9, wherein said door guide locking mechanism has a first locking function for locking the open/close operation of said door open/close guiding mechanism
    when said door open/close guiding mechanism is at the maximum opening or in a state close thereto.

11. The wrong insertion prevention device for a cartridge type recording medium according to claim 9, wherein said door guide locking mechanism has a second locking function for locking the open/close operation of said door open/close guiding mechanism immediately before said door open/close guiding mechanism closes said door or when said door open/close guiding mechanism is in a state close thereto.

12. The wrong insertion prevention device for a cartridge type recording medium according to claim 9, wherein said door guide locking mechanism is configured by: a first stopper member for locking the open/close operation of said door open/close guiding mechanism when said door open/close guiding mechanism is at the maximum opening or in a state close thereto; a second stopper member for locking the open/close operation of said door open/close guiding mechanism immediately before said door open/close guiding mechanism closes said door or when said door open/close guiding mechanism is in a state close thereto; a linking member for setting a linking operation between said first and second stopper members; and a locking-side fixed pedestal for holding the supporting shafts of rotation of said first and second stopper members, in which
    said first and second stopper members set an operation restraining area for the supporting arm of said door open/close guiding mechanism.

13. A wrong insertion prevention device for a cartridge type recording medium, comprising:
    a wrong insertion detector placed proximate a cell main body for housing a plurality of cartridge type recording media, for detecting wrong insertion of any of said cartridge type recording media; and
    a door locking apparatus for operating on the basis of output information from said wrong insertion detector to regulate a closing operation of a door for a housing case main body which has been opened during an insertion operation of said recording medium,
    said wrong insertion detector being configured by:
    a reverse direction insertion regulating member protrusion corresponding to a cutout in the cartridge type recording medium installed within each cell of said cell main body; and an optical sensor mechanism for detecting a portion of any said cartridge type recording medium that is misoriented in one of the cells so that the cutout in each said misoriented recording medium is not aligned with a corresponding said protrusion causing the misaligned recording medium to protrude outwardly;

wherein said door locking apparatus has a closing operation inhibiting function, which, when said wrong insertion detector detects wrong insertion of said cartridge type recording medium, operates to inhibit said door for said housing case main body, which has been opened, from being closed;

wherein said door locking apparatus is configured by: a door open/close guiding mechanism for guiding said door on opening or closing by reciprocally pivoting said door within the range of a predetermined opening with one end thereof as a fulcrum of rotation; a door guide locking mechanism placed side by side with said door open/close guiding mechanism, for locking the door open/close guiding mechanism on the basis of wrong insertion information from said wrong insertion detector; and a lock mechanism driving unit for urging the operation of said door guide locking mechanism at predetermined timing;

wherein said door open/close guiding mechanism is configured by: a supporting arm, one end portion of which is rotatively supported on said housing case main body, and the other end of which engages with said door and rotates by following the open/close operation of said door; and a guide rail for guiding the tip end portion of said supporting arm for movement along said door.

14. The wrong insertion prevention device for a cartridge type recording medium according to claim 13, wherein said door guide locking mechanism has a first locking function for locking the open/close operation of said door open/close guiding mechanism
    when said door open/close guiding mechanism is at the maximum opening or in a state close thereto.

15. The wrong insertion prevention device for a cartridge type recording medium according to claim 9, wherein said door guide locking mechanism has a second locking function for locking the open/close operation of said door open/close guiding mechanism immediately before said door open/close guiding mechanism closes said door or when said door open/close guiding mechanism is in a state close thereto.

16. The wrong insertion prevention device for a cartridge type recording medium according to claim 13, wherein said door guide locking mechanism is configured by: a first stopper member for locking the open/close operation of said door open/close guiding mechanism when said door open/close guiding mechanism is at the maximum opening or in a state close thereto; a second stopper member for locking the open/close operation of said door open/close guiding mechanism immediately before said door open/close guiding mechanism closes said door or when said door open/ close guiding mechanism is in a state close thereto; a linking member for setting a linking operation between said first and second stopper members; and a locking-side fixed pedestal for holding the supporting shafts of rotation of said first and second stopper members, in which said first and second stopper members set an operation restraining area for the supporting arm of said door open/close guiding mechanism.

17. A wrong insertion prevention device for a cartridge type recording medium, comprising:

a wrong insertion detector placed proximate a cell main body for housing a plurality of cartridge type recording media, for detecting wrong insertion of any of said cartridge type recording media; and a door locking apparatus for operating on the basis of output information from said wrong insertion detector to regulate a closing operation of a door for a housing case main body which has been opened during an insertion operation of said recording medium, said wrong insertion detector being configured by:

a reverse direction insertion regulating member protrusion corresponding to a cutout in the cartridge type recording medium installed within each cell of said cell main body; and an optical sensor mechanism for detecting a portion of any said cartridge type recording medium that is misoriented in one of the cells so that the cutout in each said misoriented recording medium is not aligned with a corresponding said protrusion causing the misaligned recording medium to protrude outwardly;

wherein said door locking apparatus is configured by: a door open/close guiding mechanism for guiding said door on opening or closing by reciprocally pivoting said door within the range of a predetermined opening with one end thereof as a fulcrum of rotation; a door guide locking mechanism placed side by side with said door open/close guiding mechanism, for locking the door open/close guiding mechanism on the basis of wrong insertion information from said wrong insertion detector; and a lock mechanism driving unit for urging the operation of said door guide locking mechanism at predetermined timing;

wherein said door guide locking mechanism has a second locking function for locking the open/close operation of said door open/close guiding mechanism immediately before said door open/close guiding mechanism closes said door or when said door open/close guiding mechanism is in a state close thereto.

18. A wrong insertion prevention device for a cartridge type recording medium, comprising:

a wrong insertion detector placed proximate a cell main body for housing a plurality of cartridge type recording media, for detecting wrong insertion of any of said cartridge type recording media; and a door locking apparatus for operating on the basis of output information from said wrong Insertion detector to regulate a closing operation of a door for a housing case main body which has been opened during an insertion operation of said recording medium, said wrong insertion detector being configured by:

a reverse direction insertion regulating member protrusion corresponding to a cutout in the cartridge type recording medium installed within each cell of said cell main body; and an optical sensor mechanism for detecting a portion of any said cartridge type recording medium that is misoriented in one of the cells so that the cutout in each said misoriented recording medium is not aligned with a corresponding said protrusion causing the misaligned recording medium to protrude outwardly;

wherein said door locking apparatus has a closing operation inhibiting function, which, when said wrong insertion detector detects wrong insertion of said cartridge type recording medium, operates to inhibit said door for said housing case main body, which has been opened, from being closed;

wherein said door locking apparatus is configured by: a door open/close guiding mechanism for guiding said door on opening or closing by reciprocally pivoting said door within the range of a predetermined opening with one end thereof as a fulcrum of rotation; a door guide locking mechanism placed side by side with said door open/close guiding mechanism, for locking the door open/close guiding mechanism on the basis of wrong insertion information from said wrong insertion detector; and a lock mechanism driving unit for urging the operation of said door guide locking mechanism at predetermined timing;

wherein said door guide locking mechanism has a second locking function for locking the open/close operation of said door open/close guiding mechanism immediately before said door open/close guiding mechanism closes said door or when said door open/close guiding mechanism is in a state close thereto.

19. A wrong insertion prevention device for a cartridge type recording medium, comprising:

a wrong insertion detector placed proximate a cell main body for housing a plurality of cartridge type recording media, for detecting wrong insertion of any of said cartridge type recording media; and a door locking apparatus for operating on the basis of output information from said wrong insertion detector to regulate a closing operation of a door for a housing case main body which has been opened during an insertion operation of said recording medium, said wrong insertion detector being configured by:

a reverse direction insertion regulating member protrusion corresponding to a cutout in the cartridge type recording medium installed within each cell of said cell main body; and an optical sensor mechanism for detecting a portion of any said cartridge type recording medium that is misoriented in one of the cells so that the cutout in each said misoriented recording medium is not aligned with a corresponding said protrusion causing the misaligned recording medium to protrude outwardly;

wherein said door locking apparatus is configured by: a door open/close guiding mechanism for guiding said door on opening or closing by reciprocally pivoting said door within the range of a predetermined opening with one end thereof as a fulcrum of rotation; a door guide locking mechanism placed side by side with said door open/close guiding mechanism, for locking the door open/close guiding mechanism on the basis of wrong insertion information from said wrong insertion detector; and a lock mechanism driving unit for urging the operation of said door guide locking mechanism at predetermined timing;

wherein said door guide locking mechanism is configured by: a first stopper member for locking the open/close operation of said door open/close guiding mechanism when said door open/close guiding mechanism is at the maximum opening or in a state close thereto; a second stopper member for locking the open/close operation of said door open/close guiding mechanism immediately before said door open/close guiding a mechanism closes said door or when said door open/close guiding mechanism is in a state close thereto; a linking member for setting a linking operation between said first and second stopper members; and a locking-side fixed pedestal for holding the supporting shafts of rotation of said first and second stopper members, in which said first and second stopper members set an operation restraining area for the supporting arm of said door open/close guiding mechanism.

20. A wrong insertion prevention device for a cartridge type recording medium, comprising:

a wrong insertion detector placed proximate a cell main body for housing a plurality of cartridge type recording media, for detecting wrong insert-on of any of said cartridge type recording media; and a door locking apparatus for operating on the basis of output information from said wrong insertion detector to regulate a closing operation of a door for a housing case main body which has been opened during an insertion operation of said recording medium, said wrong insertion detector being configured by:

a reverse direction insertion regulating member protrusion corresponding to a cutout in the cartridge type recording medium installed within each cell of said cell main body; and an optical sensor mechanism for detecting a portion of any said cartridge type recording medium that is misoriented in one of the cells so that the cutout in each said misoriented recording medium is not aligned with a corresponding said protrusion causing the misaligned recording medium to protrude outwardly;

wherein said door locking apparatus has a closing operation inhibiting function, which, when said wrong insertion detector detects wrong insertion of said cartridge type recording medium, operates to inhibit said door for said housing case main body, which has been opened, from being closed;

wherein said door locking apparatus is configured by: a door open/close guiding mechanism for guiding said door on opening or closing by reciprocally pivoting said door within the range of a predetermined opening with one end thereof as a fulcrum of rotation; a door guide locking mechanism placed side by side with said door open/close guiding mechanism, for locking the door open/close guiding mechanism on the basis of wrong insertion information from said wrong insertion detector; and a lock mechanism driving unit for urging the operation of said door guide locking mechanism at predetermined timing;

wherein said door guide locking mechanism is configured by: a first stopper member for locking the open/close operation of said door open/close guiding mechanism when said door open/close guiding mechanism is at the maximum opening or in a state close thereto; a second stopper member for locking the open/close operation of said door open/close guiding mechanism immediately before said door open/close guiding mechanism closes said door or when said door open/close guiding mechanism is in a state close thereto; a linking member for setting a linking a linking operation between said first and second stopper members; and a locking-side fixed pedestal for holding the supporting shafts of rotation of said first and second stopper members and in which said first and second stopper members set an operation restraining area for the supporting arm of said door open/close guiding mechanism.

* * * * *